United States Patent [19]

Welker

[11] Patent Number: 4,757,754

[45] Date of Patent: Jul. 19, 1988

[54] COFFEE MAKER

[76] Inventor: William C. Welker, 821 Jefferson St., Defiance, Ohio 43512

[21] Appl. No.: 4,590

[22] Filed: Jan. 20, 1987

[51] Int. Cl.⁴ ............................................. A47J 31/00
[52] U.S. Cl. ........................................ 99/307; 99/291
[58] Field of Search ............. 99/307, 300, 293, 302 R, 99/279, 288, 291, 295, 299; 426/433

[56] References Cited

U.S. PATENT DOCUMENTS

| | | | |
|---|---|---|---|
| 3,098,424 | 7/1963 | Perucca | 99/302 R |
| 3,278,087 | 10/1966 | Stasse | 99/302 R |
| 3,423,209 | 1/1969 | Weber | 99/307 |
| 3,520,247 | 7/1970 | Hester | 99/307 |
| 4,208,957 | 6/1980 | Bollman | 99/307 |
| 4,354,427 | 10/1982 | Filipowicz | 99/307 |

OTHER PUBLICATIONS

Hurricleen Cleaning System 815/820, Brightbill Corporation, 1800 Industrial Blvd., Norman, Okla. 73070.

Primary Examiner—Robert W. Jenkins
Attorney, Agent, or Firm—Richards, Harris, Medlock & Andrews

[57] ABSTRACT

An apparatus for brewing coffee comprising an inlet and outlet valve attached to a conduit for flowing water, a pump means interposed between said valves. A heating element comprising a coil and a burner plate. Connected to the outlet valve is a reducing nipple and water distributor.

8 Claims, 1 Drawing Sheet

COFFEE MAKER

TECHNICAL FIELD

The present invention relates to an apparatus for brewing coffee and particularly an apparatus for brewing coffee at an extremely high rate suitable for use by caterers.

BACKGROUND ART

A major problem facing caterers for a long time has been the inability to provide coffee of sufficient quality and in sufficient quantity for serving large groups. Catering is quite often done at locations which do not have sufficient equipment available, if any at all, for the brewing of large quantities of coffee in a short period of time. As a result, it is necessary for caterers to brew large quantities of coffee beforehand at their preparation kitchen and transport the coffee in insulated containers. This procedure has many drawbacks. First, the coffee was normally brewed using conventional restaurant coffee makers such as large percolators or drip coffee makers such as the Bunn machines familiar to most restaurant patrons. Thus, it took a long time to prepare large quantities of coffee such as 150 gallons which is not an uncommon amount needed for a group of 1000 people. As a result, the initially brewed coffee had to be heated or maintained hot while the rest of the coffee was brewed in batches. Of course, the longer it was necessary to heat the coffee the poorer its quality became. Placing coffee in the insulated containers started the cooling process immediately, and the coffee continues to cool as the caterer has no control of the temperature of the coffee. It is quite difficult for the caterer when he arrives at the location to reheat the coffee. Thus, depending on the amount of time in transit and delay at the use site for programs, etc., the coffee frequently becomes lukewarm or cold and unsuitable to be served. Furthermore, the method of transporting the brewed coffee is undesirable because it requires transporting the additional weight of the brewed coffee in bulky and heavy containers.

These methods also do not provide the caterer with flexibility to vary the quantity of coffee. When the demand for coffee exceeds the prior estimation, the caterer is often unable to supply additional coffee within the required amount of time at the meal location. In order to prevent such an event, caterers routinely overestimate coffee consumption in order to be assured that a sufficient quantity will be available. This of course introduces additional waste when the coffee is not consumed thereby increasing the cost of the service.

Thus, there has been a continuing need in the catering business to provide a portable coffee maker which could rapidly produce large quantities of hot, freshly brewed coffee with a minimum of waste. The present invention provides a high capacity portable coffee maker which allows the caterer to brew coffee at the meal location in such a manner as to provide coffee in a timely and efficient manner.

SUMMARY OF THE INVENTION

In the one aspect, the present invention provides for a coffee brewer which has a conduit that defines a passageway for the flow of water to be heated, a burner apparatus to heat the water flowing in the conduit to a temperature of in the range about 180° F. to about 210° F. when the water is flowing through the conduit at a flow rate of at least one gallon per minute. The conduit is provided with an inlet valve to control water flow into the heating section of the conduit and an outlet valve to control flow of the water out of the heating element. Disposed on the conduit is a pump for maintaining increased pressure in the conduit above about 150 psig. Attached to the outlet valve is a flow reducing means which in combination with a pump serves to increase the pressure of the water contained in the conduit thereby facilitating the rapid heating of water by increasing the pressure in the conduit. Attached to the reducing means is an exit conduit attached at the other end to a distributor. Positioned below the distributor is a basket for holding the coffee to be brewed and for receiving water exiting from the distributor. The basket is dimensioned so as to accommodate the flow of water from the reducing nipple while allowing the water to drip through the coffee grounds under the force of gravity and into a receptacle.

In a preferred embodiment the coffee brewer comprises a conduit defining a passageway for containing water which has an inlet and a T joint near the outlet end. An inlet valve means for controlling flow into the conduit is attached at the inlet end and an outlet valves means for controlling flow from the conduit is attached to the outlet ends. The midsection of the conduit is formed into a heating coil. Positioned between the outlet and inlet ends of the conduit is a heating coil formed by the conduit which is located above a heating means comprising a burner and fuel control apparatus. Interposed along the conduit between the inlet valve and heating coil is a pump to maintain increased pressure. A temperature sensor and a pressure sensor are located downstream of the heating coil to monitor and control the heating means. These sensors are connected to the heating means to control the temperature of the water contained in the conduit and to prevent overpressurization of the system. Connected to the outlet valves are reducing means which reduce the diameter of the conduit and in combination with the pump maintains increased pressure in the conduit and heating coil to provide for the increased heating rate for the water. Connected to the reducing means is a water distributors. Removably positioned under the water distributors are coffee baskets for holding coffee grounds having an outlet at their bottoms and an open top for receiving hot water from the water distributors.

DETAILED DESCRIPTION

A clearer understanding of the invention will be had from the detailed description of the preferred embodiment but which is not limiting of the invention.

Figure 1:
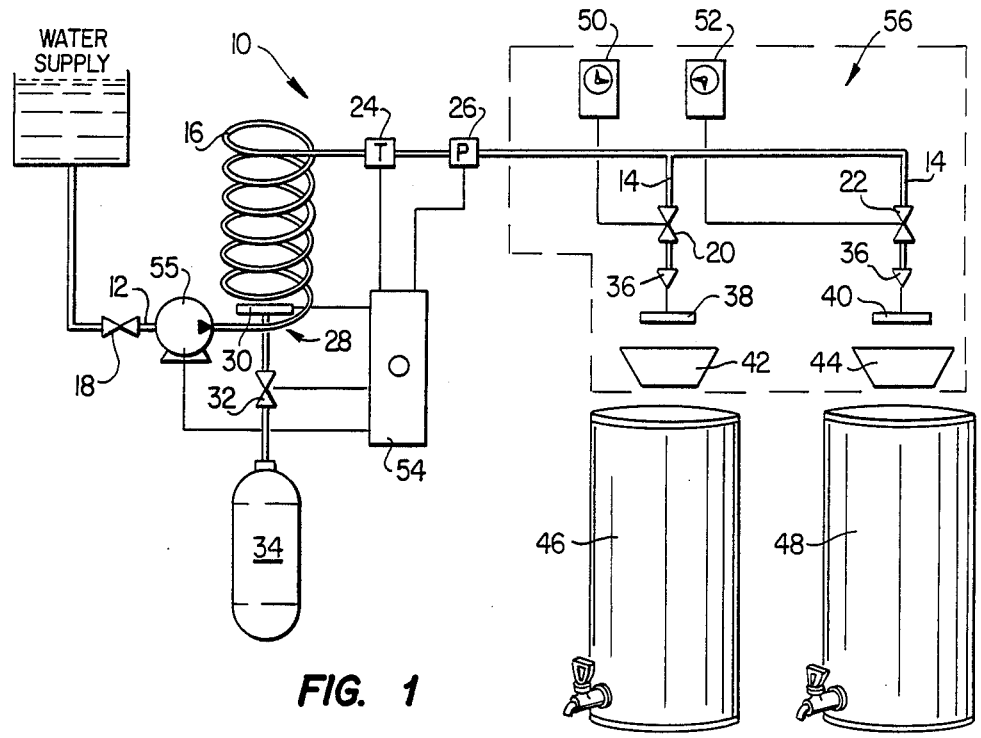
FIG. 1 is a schematic representation of the coffee maker.

FIG. 1 is a schematic representation of the preferred embodiment of the present invention having two outlets. The conduit generally indicated as 10 defines a passageway for the flow of water to be heated which has an inlet end 12 and two outlet ends 14 and a heating coil 16 in the midsection. Attached to the inlet end 12 is inlet valve means 18 for controlling the flow of water into the conduit 10, and attached to the outlet ends 14 are valve means 20 and 22 for controlling the flow of water exiting the conduit 10. Interposed between valves 18, 20 and 22 are pressure sensing means 24 and temperature sensing means 26. Positioned at the heating coil 16 is a burner means generally indicated as 28 for heating the water passing through heating coil 16. Burner means 28 has a burner plate 30 and a fuel valve 32 controlling the flow of fuel to the burner. The burner valve is connected to fuel source 34.

Attached to outlet valve means 20 and 24 are reducing means 36. The reducing means can be a suitable reducing nipple which decreases the diameter of the conduit to restrict flow to the desired rate. In an alternative construction a reducing nipple can be placed upstream of valves 20 and 22. In another alternative the reducing means can be incorporated into the outlet valve means.

In FIG. 1, two valves 20 and 22, nipples 36 are shown and the nipples are connected to water distributors 38 and 40. This represents the preferred embodiment which provides for two brew heads such that a second batch of coffee can be started while one is waiting for the first to finish leaching through the coffee grounds. It is recognized that two brew heads are not required and because each functions in the same manner, only one will be described in detail in terms of operation.

Positioned underneath the water distributors 38 and 40 are coffee baskets 42 and 44. The coffee baskets are open at the top and have an outlet at the bottom which allows coffee to flow into serving vessels 46 and 48.

In the preferred embodiment, timer switches 50 and 52 are provided which actuate outlet valves 20 and 22. Also provided is burner control means 54.

The preferred embodiment also includes a pump 55 positioned between the inlet valve 18 and the heating coil 16. The pump 55 is used to increase the pressure of the water inside the heating coil to allow for heating of the water at an increased rate. The pump 55 in combination with reducing means creates a water pressure of greater than about 150 p.s.i.g. or more in conduit 10 while maintaining the desired flow rate of up to 2 gallons of water per minute or more. The pump 55 runs on electricity, and therefore, it requires an electrical source which may be an ordinary wall outlet, an appropriate cord, and internal wiring to supply electricity to the pump.

In operation the portable apparatus is connected to a source of drinking water which is usually a faucet connected to a municipal water source. This can easily be done by connecting the inlet valve 18 to the faucet by a suitable piece of hose. Although the apparatus can be operated manually, it will be described in relation to the preferred embodiment which utilizes automatic controls. These automatic controls also require electricity so proper wiring must be provided. Once the brewing apparatus is connected to power source and a source of water, valve 18 is opened allowing water to fill conduit 10.

The water is stopped by outlet valves 20 and 22. The water will be at ambient temperature from the source. Thereafter, the temperature sensor is set at the desired temperature, such as 195° F. Burner control means 54 is then turned on. If the temperature is below the set temperature of sensor 24, the control means 54 opens fuel valve 32. The fuel is ignited at burner plate 30 by a pilot light or electronic ignition device connected to control means 54, and pump 55 is started. When the water reaches the set temperature or when the pressure reaches the set pressure the burner control means 54 closes valve 32 extinguishing the flame at burner 30. After the burner is engaged and the water reaches temperature the brewing apparatus is activated. Brew head 56 (indicated by dotted lines) consists of the two outlets, outlet valve 20 and 22, reducing nipples 36 and water distributors 38 and coffee baskets 42 and 44. Pressing timer switch 50 opens solenoid valve 20 for a predetermined time allowing hot water to flow into the coffee basket 42 containing a filter and coffee grounds, allowing hot water to leach through the coffee and into serving vessel 46. After the predetermined time the timer switch 50 closes valve 20. In response to the opening of outlet valve 20, the temperature sensor 24 signals the burner control 54 which ignites the burner 28 to heat the flowing water. When the valve 20 closes the operator then pushes timer switch 52 to initiate flow into coffee basket 44 and the process continues. While coffee is flowing into service vessel 48, a fresh supply of coffee can be charged to basket 42. The alternating procedure allows for continuous brewing of coffee.

One important feature of the present invention is that the brew may be located distant from the burner. Thus, the heating components can be contained in a unit which remains outside of a building, and the brew head and controls can be connected to the heating components by a flexible conduit. This allows the burner to remain outside and not be a potential fire hazard to the building, while allowing the operator to remain warm and comfortable in a building.

Figure 2:
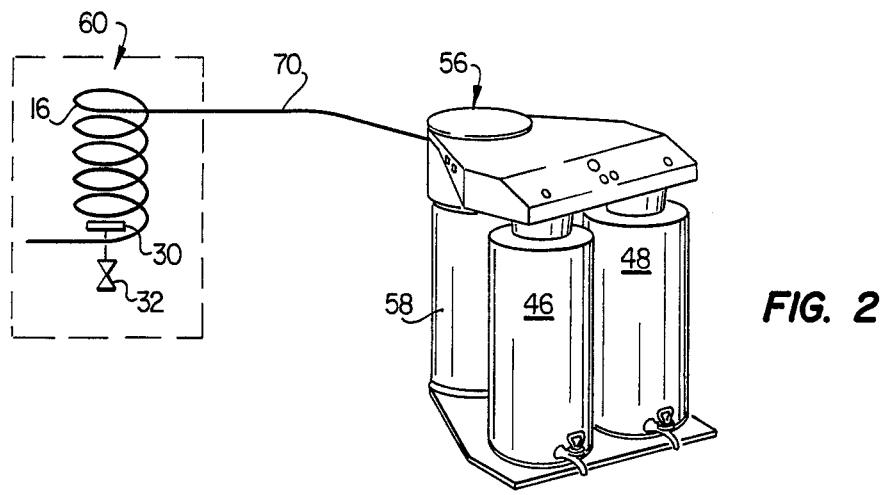
FIG. 2 is a schematic representation of the coffee with a remote brewing head.

As shown in FIG. 2, the brewing head 56 may be made remote from the heating element 60 by lengthening conduit 16 such as by the insertion of a hose 70 and between the heating element 60 and the brewing head 56. The brewing head 56 may be detached from the conduit and attached to a stand 58 for support. Thus, the brewing head 56 may be distantly removed from the heating coil. This allows the heating element 60 to be left outside while the coffee is brewed indoors.

The invention may also include various safety devices that prevent the coffee maker from overheating the water or from developing too high a pressure. For example, a water cushion may be included in the conduit to serve as a release for excess water pressure.

A suitable coffee brewer can be made utilizing a steam cleaning device modified by the addition of valves, controls, and coffee baskets. A Hurricleen 815/820 steam cleaner sold by the Brightbill Corporation of Norman, Okla. was modified such that the water temperature was adjusted to 195° F. and the operating pressure was in the range of 150 to 600 p.s.i.g. The outlet of the stream cleaner was attached to a brew head fashioned from a pipe having a reducing nipple with an inside diameter of 3/64 inches to restrict the flow of the 600 p.s.i.g. water exiting the cleaner to a flow rate of two gallons per minute. After the reducing nipple a solenoid valve controlled by a variable timer type was used. The solenoid valve was a AHP20-1000 sold by Gould Valve and the variable timer was a general purpose timing relay sold under the trade designation JCK-46 sold by Square D. Connected to the solenoid valve was a water distributor of 3.25 inches in diameter with 30 holes of 3/36 inch diameter. This was positioned over a basket of 14 inches diameter and 10 inches in depth. When the basket was loaded with 1.2 pounds of coffee in a filter and water flow activated, the coffee maker can produce about 105 cups of coffee in 2.2 minutes.

It should be apparent that the invention describes a coffee maker that can produce a large amount of coffee in a short amount of time by heating the water under pressure and then allowing the water to drip through coffee grounds and a filter. Having described one embodiment, it will be apparent to those skilled in the art that various modifications and changes may be made without departing from the spirit of the invention.

I claim:

1. A portable coffee maker comprising:
   a conduit defining a passageway for the flow of water therethrough having an inlet and outlet;
   an inlet valve for controlling the flow of water into said conduit,
   one or more outlet valves connected to the outlet of said conduit for controlling the flow of water out of said conduit;
   a heating coil formed from the conduit and positioned between the inlet and outlet of said conduit;
   a pump and a reducing means for maintaining pressure in said conduit during operation above about 150 psig;
   a heating means for heating the water passing through said heating coil;
   a temperature sensing means for sensing the temperature of the water passing through said conduit located downstream of said heating coil;
   a water distributor connected to said outlet valve; and
   a coffee basket positioned below said water distributor to receive water from said distributor.

2. The coffee maker of claim 1 wherein the heating means comprises a gas burner.

3. The coffee maker of claim 2 further comprising a portable gas cannister that supplies gas fuel to the burner.

4. The coffee maker of claim 1 further comprising pressure release means to release excess pressure in said passageway.

5. The coffee maker of claim 1 wherein the pressure release means is a water cushion incorporated into the conducting means.

6. A portable coffee maker comprising:
   a heating coil having inlet means for receiving a flow of water and outlet means for controlling the flow of water exiting the heating coil;
   a gas burner located adjacent to a portion of the heating coil for heating the water as it flows through the coil;
   a pump and a reducing means interposed between the inlet means and the outlet means of the heating coil with the pump being used for increasing the water pressure behind the reducing means such that the water in the coil may be heated more rapidly; and
   brewing means comprising at least one brewing head, a basket in which coffee grounds may be placed, and a spigot for dispensing the coffee into a suitable container, whereby said brewing means receives heated water from the outlet means of the heating coil and allows the water to trickle through the basket.

7. The coffee maker of claim 6 further comprising a portable gas cannister for supplying gas to the burner.

8. The coffee maker of claim 7 further comprising a hose interposed between the outlet means of the heating coil and the brewing means such that the brewing means may be removed some distance from the heating coil.

* * * * *